(12) United States Patent
Watanabe et al.

(10) Patent No.: US 7,501,206 B2
(45) Date of Patent: Mar. 10, 2009

(54) BIPOLAR BATTERY, ASSEMBLED BATTERY, COMBINATION ASSEMBLED BATTERY, AND VEHICLE USING THE ASSEMBLED BATTERY OR THE COMBINATION ASSEMBLED BATTERY

(75) Inventors: Kyoichi Watanabe, Yokosuka (JP); Kouichi Nemoto, Zushi (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 680 days.

(21) Appl. No.: 10/912,235

(22) Filed: Aug. 6, 2004

(65) Prior Publication Data
US 2005/0031953 A1  Feb. 10, 2005

(30) Foreign Application Priority Data
Aug. 8, 2003 (JP) ............ P2003-290977

(51) Int. Cl.
*H01M 10/36* (2006.01)
(52) U.S. Cl. ............ 429/210; 429/211; 429/160
(58) Field of Classification Search ............ None
See application file for complete search history.

(56) References Cited

U.S. PATENT DOCUMENTS

| | | | | |
|---|---|---|---|---|
| 5,595,839 | A * | 1/1997 | Hossain ............ | 429/210 |
| 5,948,562 | A * | 9/1999 | Fulcher et al. ............ | 429/181 |
| 2001/0038938 | A1 | 11/2001 | Takahashi et al. | |
| 2003/0224246 | A1 * | 12/2003 | Watanabe et al. ............ | 429/159 |
| 2004/0038122 | A1 * | 2/2004 | Hisamitsu et al. ............ | 429/120 |

FOREIGN PATENT DOCUMENTS

| | | |
|---|---|---|
| EP | 0862227 A1 | 9/1998 |
| EP | 1202371 A1 | 5/2002 |
| EP | 1282186 A1 | 2/2003 |
| JP | 11-162443 | 6/1999 |
| JP | 2000-100471 | 4/2000 |
| JP | 2000-173560 | 6/2000 |
| JP | 2000-195495 | 7/2000 |

OTHER PUBLICATIONS

Japanese Office Action, with English Translation, issued in Japanese Patent Application No. 2003-290977, dated on Dec. 18, 2007.
European Search Report issued in European Patent Application No. 04017511.9-1227 dated on Jun. 9, 2008.

\* cited by examiner

*Primary Examiner*—John S Maples
(74) *Attorney, Agent, or Firm*—McDermott Will & Emery LLP

(57) ABSTRACT

A bipolar battery of the present invention includes a battery element composed by stacking in series a plurality of bipolar electrodes, in each of which a positive electrode is formed on one surface of a collector and a negative electrode is formed on the other surface, with electrolytes interposed therebetween. Further, the bipolar battery includes laminate films covering the battery element, each of the laminate films containing a metal layer, and tabs composed by being extracted from the battery element to outsides of the laminate films. In the bipolar battery, thickness of a resin layer interposed between the tab and the metal layer is equal to or more than thickness of the tab.

14 Claims, 12 Drawing Sheets

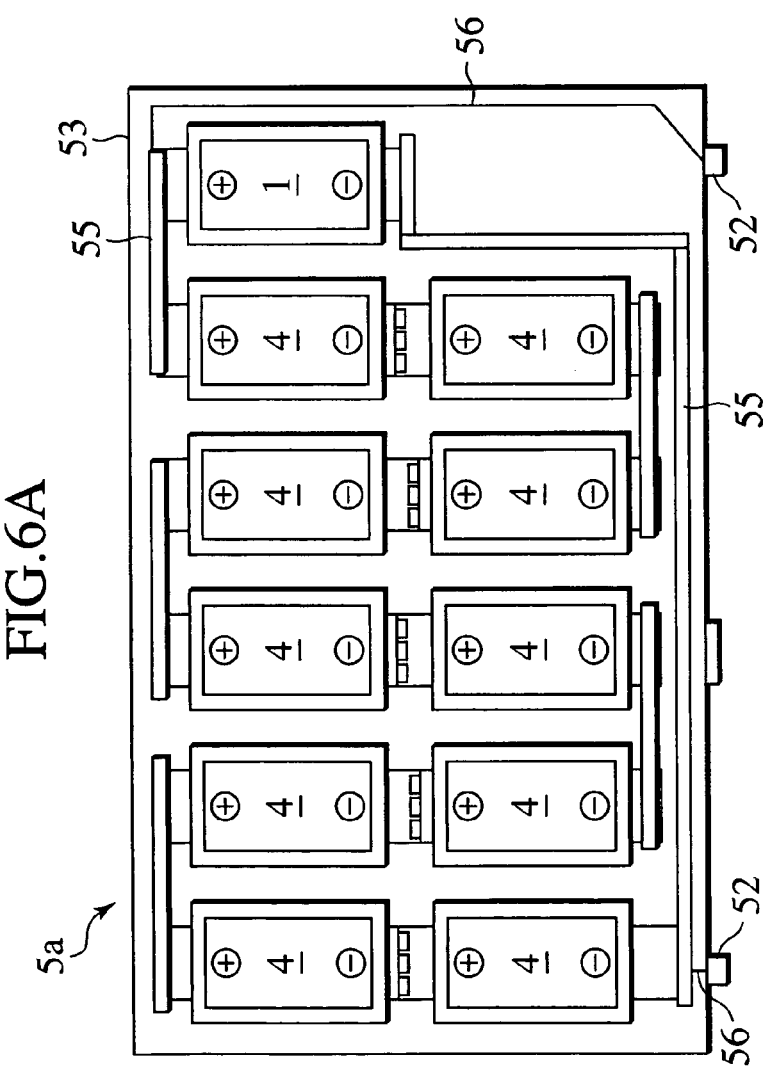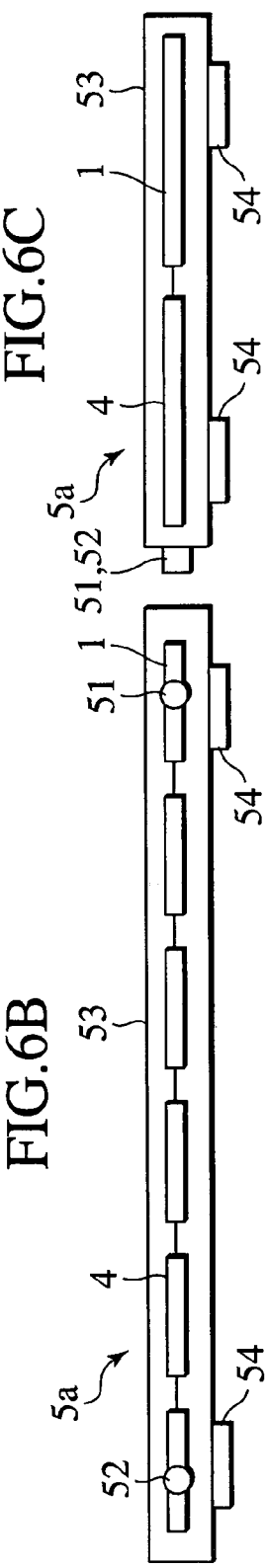

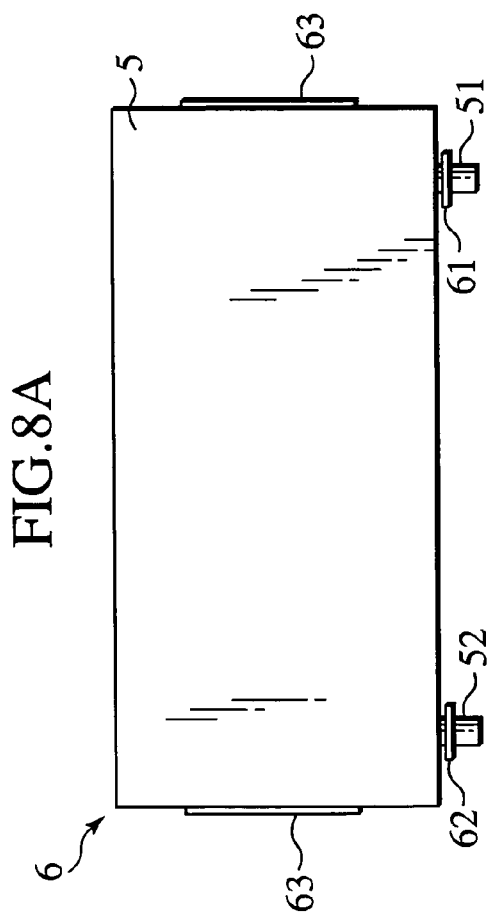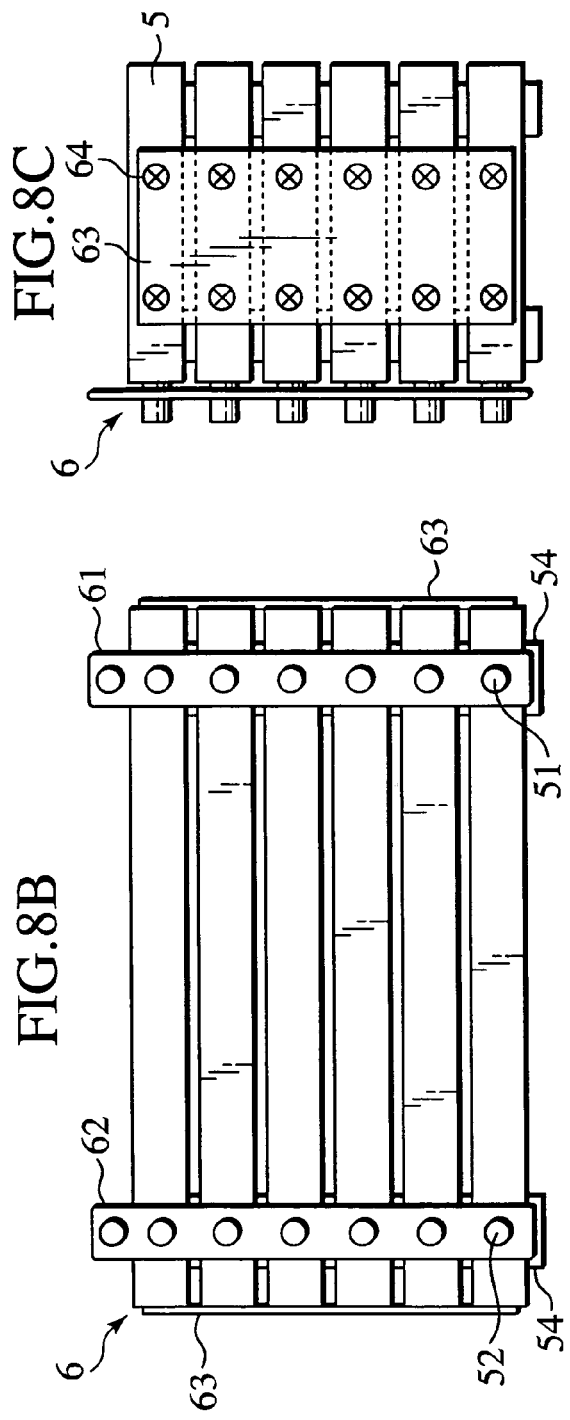

FIG.10

| | Number of Constituent Units | Boundary Resin Layer | Type of Resin | Thickness of Tab (μm) | Thickness of Resin Layer/ Thickness of Tab | Positive Electrode Active Material | Negative Electrode Active Material | Insulating Property | Average Attenuation (%) | Shift Amount of Resonance Point (Hz) |
|---|---|---|---|---|---|---|---|---|---|---|
| Example 1 | 10 | FIG.3 | Resin 1 | 150 | 1 | Li-Mn based | Non-Crystalline Carbon Material | Y | 22 | 110 |
| Example 2 | 10 | FIG.3 | Resin 2 | 150 | 1 | Li-Mn based | Non-Crystalline Carbon Material | Y | 28 | 120 |
| Example 3 | 10 | FIG.3 | Resin 3 | 150 | 1 | Li-Mn based | Non-Crystalline Carbon Material | Y | 20 | 105 |
| Example 4 | 10 | FIG.3 | Resin 4 | 150 | 1 | Li-Mn based | Non-Crystalline Carbon Material | Y | 22 | 110 |
| Example 5 | 10 | FIG.3 | Resin 5 | 150 | 1 | Li-Mn based | Non-Crystalline Carbon Material | Y | 10 | 85 |
| Example 6 | 10 | FIG.3 | Resin 6 | 150 | 1 | Li-Mn based | Non-Crystalline Carbon Material | Y | 15 | 95 |
| Example 7 | 10 | FIG.3 | Resin 4 | 100 | 2 | Li-Mn based | Crystalline Carbon Material | Y | 40 | 140 |
| Example 8 | 10 | FIG.3 | Resin 4 | 50 | 5 | Li-Mn based | Non-Crystalline Carbon Material | Y | 60 | 170 |
| Example 9 | 10 | FIG.4 | Resins 1 and 2 | 200 | 2(=1+1) | Li-Mn based | Non-Crystalline Carbon Material | Y | 45 | 150 |
| Example 10 | 10 | FIG.4 | Resins 3 and 4 | 200 | 3(=2+1) | Li-Mn based | Non-Crystalline Carbon Material | Y | 55 | 160 |
| Example 11 | 100 | FIG.3 | Resins 4 | 300 | 1 | Li-Mn based | Non-Crystalline Carbon Material | Y | 21 | 108 |
| Comparative Example 1 | 10 | FIG.3 | Resins 4 | 150 | 0.1 | Li-Mn based | Non-Crystalline Carbon Material | N | — | — |
| Comparative Example 2 | 10 | FIG.3 | Resins 4 | 50 | 0.9 | Li-Mn based | Non-Crystalline Carbon Material | N | 5 | 30 |

FIG.11

| Name of Resin | Resin 1 | Resin 2 | Resin 3 | Resin 4 | Resin 5 | Resin 6 |
|---|---|---|---|---|---|---|
| | Polyethylene | Low-Density polyethylene | Polypropylene | Non-Modified polypropylene | Nylon | Nylon 6, 10 |
| Young's Modulus ($\times 10^{10}$ N/m$^2$) | 0.05 | 0.01 | 0.06 | 0.05 | 0.29 | 0.2 |
| Dielectric Breakdown Strength (kV/mm) | 19 | 19 | 23 | 23 | 18 | 18 |

BIPOLAR BATTERY, ASSEMBLED BATTERY, COMBINATION ASSEMBLED BATTERY, AND VEHICLE USING THE ASSEMBLED BATTERY OR THE COMBINATION ASSEMBLED BATTERY

BACKGROUND OF THE INVENTION

1. Field of the Invention

The present invention relates to a bipolar battery, an assembled battery, a combination assembled battery, and a vehicle using the assembled battery or the combination assembled battery.

2. Description of the Related Art

In recent years, as electric vehicles have been developed more actively, secondary batteries have also been developed more actively. Among the secondary batteries, a lithium ion battery is particularly a high-performance battery characterized by compactness, lightweight, high energy density, high power density, and the like, and accordingly, has gained attention as a battery mountable on such an electric vehicle.

However, in order to apply the secondary battery to the vehicle, it is necessary to connect a plurality of the secondary batteries in series for the purpose of ensuring large power. However, when the batteries are connected to one another through connecting portions, the power of the connected batteries is lowered due to electric resistance of the connecting portions, and a disadvantage occurs also in terms of a space.

As a battery which solves the problems described above, there has been developed a bipolar battery composed by including bipolar electrodes in each of which a positive electrode and a negative electrode are individually formed on both surfaces of a collector (refer to Japanese Patent Application Laid-Open Nos. 2000-100471 and 2000-195495).

SUMMARY OF THE INVENTION

However, in the conventional bipolar battery, it has been difficult to sufficiently ensure insulating properties against high voltage. For example, in terms of the insulating properties, it has been difficult to use, at high voltage, such a bipolar battery as for use in an electronic instrument even if tabs connected to the electrodes of the battery are resistant to the high voltage.

Hence, there has been a problem that it is extremely difficult to use the conventional bipolar battery for the purpose in which insulation resistant to such high voltage as exceeding 400 V for the vehicle is required.

Moreover, technologies regarding the bipolar battery, which are described in Japanese Patent Application Laid-Open Nos. 2000-100471 and 2000-195495, do not include any consideration about the above-described problem, or do not present a specific method for solving the problem.

The present invention has been created in order to solve the above-described problem. It is an object of the present invention to provide a bipolar battery, an assembled battery, and a combination assembled battery, which are capable of ensuring the insulation resistant to the high voltage, and to provide a vehicle using the assembled battery or the combination assembled battery.

The first aspect of the present invention provides a bipolar battery comprising: a battery element composed by stacking in series a plurality of bipolar electrodes, in each of which a positive electrode is formed on one surface of a collector and a negative electrode is formed on the other surface, with electrolytes interposed therebetween; laminate films covering the battery element, each of the laminate films containing a metal layer; and tabs composed by being extracted from the battery element to outsides of the laminate films, wherein thickness of a resin layer interposed between the tab and the metal layer is equal to or more than thickness of the tab.

The second aspect of the present invention provides an assembled battery comprising: a plurality of bipolar batteries, each including: a battery element composed by stacking in series a plurality of bipolar electrodes, in each of which a positive electrode is formed on one surface of a collector and a negative electrode is formed on the other surface, with electrolytes interposed therebetween; laminate films covering the battery element, each of the laminate films containing a metal layer; and tabs composed by being extracted from the battery element to outsides of the laminate films, wherein thickness of a resin layer interposed between the tab and the metal layer is equal to or more than thickness of the tab, and the plurality of bipolar batteries are connected in parallel and/or in series.

BRIEF DESCRIPTION OF THE DRAWINGS

The invention will now be described with reference to the accompanying drawings wherein;

FIG. 6A is a plan view of an assembled battery according to a third embodiment of the present invention;

FIG. 6B is a front view of the assembled battery according to the third embodiment of the present invention;

FIG. 6C is a side view of the assembled battery according to the third embodiment of the present invention;

FIG. 8A is a plan view of a combination assembled battery according to a fourth embodiment of the present invention;

FIG. 8B is a front view of the combination assembled battery according to the fourth embodiment of the present invention;

FIG. 8C is a side view of the combination assembled battery according to the fourth embodiment of the present invention;

FIG. 10 is a table showing constitutions of bipolar batteries of examples and comparative examples, and evaluation results thereof;

FIG. 11 is a table showing names and properties of resins shown in FIG. 10; and

DETAILED DESCRIPTION OF THE PREFERRED EMBODIMENT

Hereinafter, description will be made of embodiments of the present invention with reference to the drawings.

First Embodiment

Figure 1:
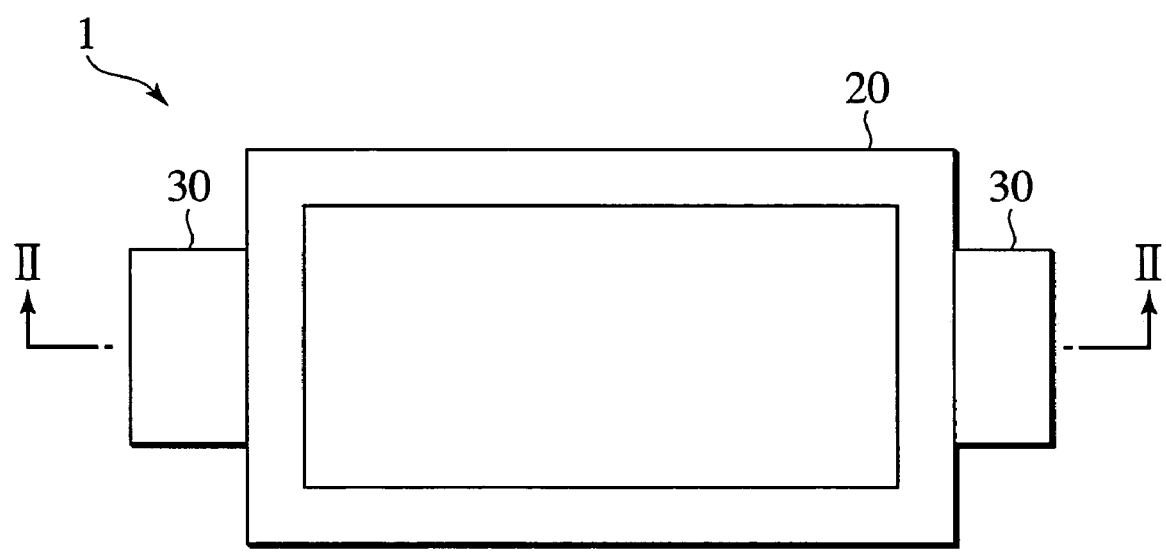
FIG. 1 is a plan view of a bipolar battery according to a first embodiment of the present invention.
Figure 2:
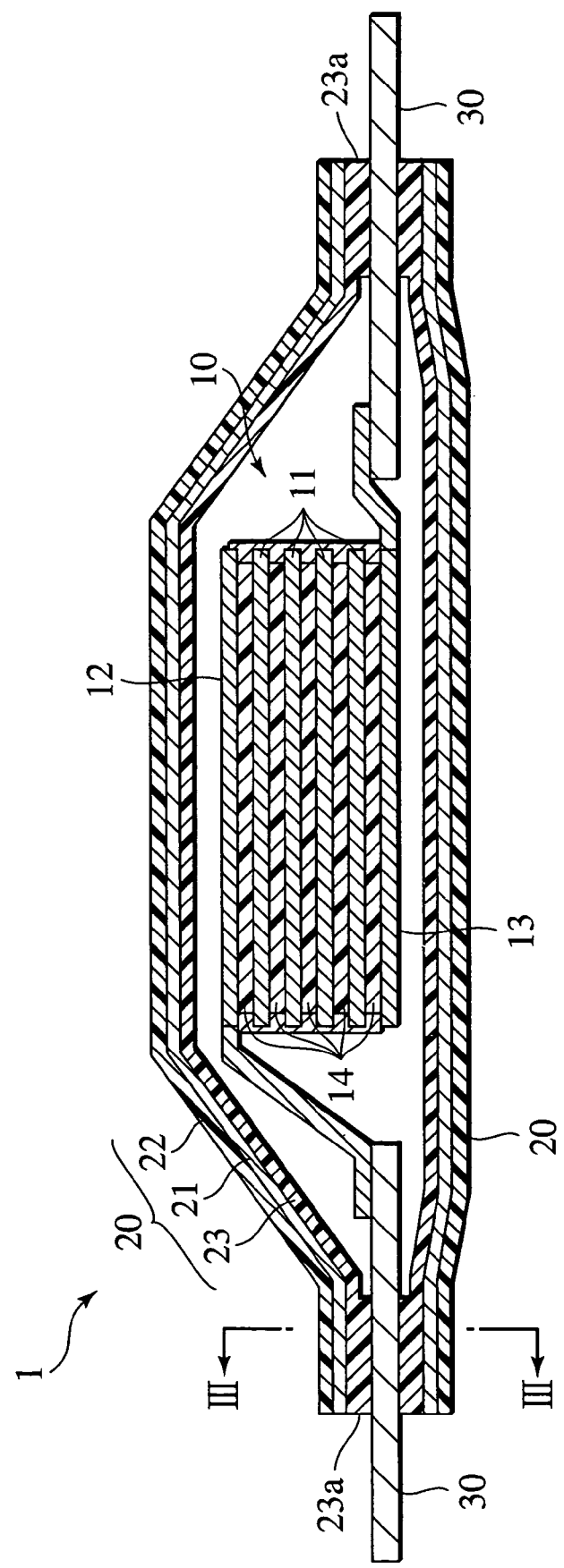
FIG. 2 is an enlarged cross-sectional view along a line II-II of FIG. 1.

As shown in FIGS. 1 and 2, a bipolar battery 1 of the present invention includes a battery element 10, laminate films 20 covering the battery element 10, and tabs 30 composed by being extracted from the battery element 10 to outsides of the laminate films 20.

The battery element 10 is constituted in the following manner. Specifically, in the battery element 10, a plurality of bipolar electrodes 11 in each of which a positive electrode is formed on one surface of a collector and a negative electrode is formed on the other surface are connected in series with electrolytes 14 interposed therebetween, and the battery element 10 forms a stack structure. It is possible to arbitrarily set the number of stacked layers. Moreover, on both end portions in a stack direction of the battery element 10, end electrodes 12 and 13 in each of which the positive or negative electrode is formed on only one surface of the collector are provided. The end electrodes 12 and 13 are connected to the tabs with connecting leads.

The collector is formed of a material that can be formed into any film shape by a thin-film manufacturing technology such as spray coating. The collector mainly contains metal powder of aluminum, copper, titanium, nickel, stainless steel (SUS), an alloy thereof, or the like, and is composed by forming a metal paste, which contains a binder, a solvent and the like on the metal powder, by hot forming. For the collector described above, one of the metal powders may be used singly, or two or more thereof may be mixedly used. Alternatively, the collector may be one formed by multiply stacking films containing metal powders different in type while making full use of characteristics of the manufacturing method. The above-described binder is not particularly limited, and for the binder, a conductive polymer material may be used as well as epoxy resin and the like can be used. Moreover, for the collector, foil of the above-described metal can also be used besides the above-described one formed of the metal powder and the binder. Thickness of these collectors is not particularly limited, but usually ranges approximately from 1 to 100 µm.

The positive electrode contains a positive electrode active material, and besides this, can contain an electrolyte, lithium salt, a conductive material and the like for the purpose of enhancing ion conductivity. As the conductive material, acetylene black, carbon black, graphite and the like are given. However, the conductive material is not limited to these. While it is desirable that the electrolyte, and preferably a solid polymer electrolyte, be contained in at least one of the positive and negative electrodes, it is preferable that the electrolyte be contained in both thereof in order to improve battery characteristics of the bipolar battery more.

As the positive electrode active material, composite oxide of transition metal and lithium, which is used also for a liquid-type lithium ion battery, can be used. Specifically, there are given Li—Co-based composite oxide such as $LiCoO_2$, Li—Ni-based composite oxide such as $LiNiO_2$, Li—Mn-based composite oxide such as spinel $LiMn_2O_4$, Li—Fe-based composite oxide such as $LiFeO_2$, and the like. Besides the above, there are given a phosphate compound and sulfate compound of transition metal and lithium, such as $LiFePO_4$; transition metal oxide and sulfide, such as $V_2O_5$, $MnO_2$, $TiS_2$, $MoS_2$, $MoO_3$; $PbO_2$, $AgO$, $NiO(OH)$; and the like. It is satisfactory if particle diameter of the positive electrode active material is sufficient for converting a positive electrode material into a paste, coating the paste by the spray coating and the like and forming the coated paste into a film in a state before polymerizing the positive electrode material in terms of the manufacturing method.

Preferably, the positive electrode active material is the Li—Mn-based composite oxide. The Li—Mn based composite oxide is employed as the positive electrode active material, thus making it possible to easily change the slope in a graph of a charge/discharge profile representing a relationship between a voltage (V) and a charge state (%). Thus, the charge state of the battery is found out if the voltage of the battery is measured. As described above, the charge state of the battery is easily detected, and a state of overcharge or overdischarge of the battery can be prevented, thus making it possible to enhance reliability of the battery. Moreover, even in the event where the battery goes out of order because the overcharge or the overdischarge occurs, a reaction in this event becomes gentle, and accordingly, it can be said that the battery is high in reliability when abnormalities occur.

Moreover, a salt of inorganic acid anion such as $LiPF_6$, $LiBF_4$, $LiClO_4$, $LiAsF_6$, $LiTaF_6$, $LiAlCl_4$ and $Li_2B_{10}Cl_{10}$, a salt of organic acid anion such as $Li(CF_3SO_2)_2N$ and $Li(C_2F_5SO_2)_2N$, a mixture thereof, or the like are usable as the above-described lithium salt. However, the lithium salt is not limited to these.

A blending quantity of the positive electrode active material, the electrolyte (preferably, the solid polymer electrolyte), the lithium salt and the conductive material in the positive electrodes should be determined in consideration of an intended purpose of the battery (in which power is emphasized, energy is emphasized, and so on) and the ion conductivity. When the blending quantity of the electrolyte, and particularly the solid polymer electrolyte, in the positive electrodes is too small, ion conduction resistance and ion diffusion resistance in an active material layer become increased, and performance of the battery becomes lowered. Meanwhile, when the blending quantity of the electrolyte, and particularly the solid polymer electrolyte, in the positive electrodes is too large, energy density of the battery becomes lowered. Hence, the quantity of the solid polymer electrolyte should be determined so as to coincide with the purpose in consideration of these factors.

Thickness of the positive electrodes is not particularly limited. As in the description for the blending quantity, the thickness should be determined in consideration of the intended purpose of the battery (in which the power is emphasized, the energy is emphasized, and so on) and the ion conductivity. The thickness of layers of the positive electrode active material generally ranges approximately from 10 to 500 µm.

The negative electrode contains a negative electrode active material. Moreover, similarly to the positive electrode, the negative electrode can contain the electrolyte, the lithium salt, the conductive material and the like for the purpose of enhancing the ion conductivity. A composition of the negative electrode is basically similar to that described for the positive electrode other than a type of the negative electrode active material, and accordingly, description thereof will be omitted here.

As the negative electrode active material, a negative electrode active material used also for the liquid-type lithium ion battery can be used. However, the solid polymer electrolyte is preferably used in the bipolar battery, and accordingly, what is given as the negative electrode active material in consideration of reactivity thereof in the solid polymer electrolyte is metal oxide, composite oxide of metal and lithium, carbon and the like. One of these materials may be used singly, or two or more thereof may be used in combination.

Preferably, the negative electrode active material is a crystalline carbon material (graphite) or a non-crystalline carbon material (hard carbon). The crystalline carbon material or the non-crystalline carbon material is employed as the negative electrode active material, thus making it possible to easily change the slope in the graph of the charge/discharge profile. Thus, the charge state of the battery is found out if the voltage of the battery is measured. As described above, the charge state of the battery is easily detected, and the state of overcharge or overdischarge of the battery can be prevented, thus making it possible to enhance the reliability of the battery. In the non-crystalline carbon material, such an effect is particularly significant, and therefore, the non-crystalline carbon material is more preferable.

As the electrolytes 14, even a polymer gel electrolyte can be used as long as the electrolyte can prevent a liquid junction as well as the solid polymer electrolyte can be used. Moreover, these electrolytes can be used in combination. Furthermore, the electrolyte can also be formed into a multilayer structure, and layers varied in type of the electrolytes and in blended ratio of the components depending on the positive electrode side and the negative electrode side can also be formed.

In the case of using the polymer gel electrolyte as the electrolytes 14, a mass ratio of a polymer and an electrolytic solution, which constitute the polymer gel electrolyte, is within a range from 20:80 to 98:2, where a ratio of the electrolytic solution is relatively small. However, it is the solid polymer electrolyte that is more preferably used. Reasons for this are as follows. First, the solid polymer electrolyte is excellent in heat resistance as compared with the polymer gel electrolyte and a liquid electrolyte. Next, there is no possibility that the solid polymer electrolyte is decomposed by heat, vaporized at high temperature, or ignited. Moreover, the solid polymer electrolyte is excellent in resistance to nail penetration and difficult to cause a liquid leakage and a short circuit, which may be caused by a breakdown due to an external load and the like. Furthermore, the solid oxide electrolyte can effectively utilize characteristics inherent therein, which are compactness and a capability of freely designing a shape thereof.

The solid polymer electrolyte used as the electrolytes 14 is layers composed of a polymer with the ion conductivity, and a material thereof is not limited as long as the material exhibits the ion conductivity. As the solid polymer electrolyte, polyethylene oxide (PEO), polypropylene oxide (PPO), and a copolymer thereof are given. Lithium salt is contained in the solid polymer electrolyte for the purpose of ensuring the ion conductivity. As the lithium salt, $LiBF_4$, $LiPF_6$, $LiN(SO_2CF_3)_2$, $LiN(SO_2C_2F_5)_2$, a mixture thereof or the like can be used. However, the lithium salt is not limited to these. A polyalkylene oxide series polymer such as PEO and PPO can dissolve the lithium salt such as the $LiBF_4$, $LiPF_6$, $LiN(SO_2CF_3)_2$ and $LiN(SO_2C_2F_5)_2$ well. Moreover, the polyalkylene oxide series polymer forms a crosslinked structure, and thus expresses an excellent mechanical strength.

Meanwhile, the polymer gel electrolyte used as the electrolytes 14 is one in which an electrolytic solution usually used in the lithium ion battery is contained in the solid polymer electrolyte with the ion conductivity. However, one in which a similar electrolytic solution is retained in a backbone of a polymer without lithium ion conductivity is further included in the polymer gel electrolyte.

Note that, here, a difference between the solid polymer electrolyte and the polymer gel electrolyte is prescribed as follows. One in which the electrolytic solution usually for use in the lithium ion battery is contained in the solid polymer electrolyte such as polyethylene oxide (PEO) is the polymer gel electrolyte. Moreover, one in which the electrolytic solution is retained in the backbone of the polymer without the lithium ion conductivity, such as polyvinylidene fluoride (PVDF), also corresponds to the polymer gel electrolyte. A ratio of the polymer and the electrolytic solution, which constitute the polymer gel electrolyte, ranges widely. When the polymer of 100% is defined as the solid polymer electrolyte and the electrolytic solution of 100% is defined as the liquid electrolyte, all intermediates thereof correspond to the polymer gel electrolyte.

The solid polymer electrolyte used for the polymer gel electrolyte is not particularly limited as long as the electrolyte contains a polymer with the ion conductivity. As the polymer with the ion conductivity, the polyalkylene oxide series polymer such as polyethylene oxide (PEO) and polypropylene oxide (PPO), the copolymer thereof, and the like, are given. Note that it is satisfactory if the copolymer is at least one having polymer chains with the ion conductivity. For example, the copolymer may be polyvinylidene fluoride-hexafluoropropylene that is a copolymer containing the polyvinylidene fluoride without the ion conductivity. The above-described polyalkylene oxide series polymer can dissolve the lithium salt such as $LiBF_4$, $LiPF_6$, $LiN(SO_2CF_3)_2$ and $LiN(SO_2C_2F_5)_2$ well. Moreover, the polyalkylene oxide series polymer forms a crosslinked structure, and thus expresses an excellent mechanical strength, which is advantageous.

As prescribed above, the foregoing polymer gel electrolyte is one in which the electrolytic solution usually for use in the lithium ion battery is contained in the solid polymer electrolyte with the ion conductivity, and further, is one in which the similar electrolytic solution is retained in the backbone of the polymer without the lithium ion conductivity. Here, it is satisfactory if the electrolytic solution (an electrolyte salt, and a plasticizer) contained in the polymer gel electrolyte is one usually for use in the lithium ion battery. As the electrolyte salt, at least one type of lithium salt selected from the salt of inorganic acid anion such as $LiPF_6$, $LiBF_4$, $LiClO_4$, $LiAsF_6$, $LiTaF_6$, $LiAlCl_4$ and $Li_2B_{10}Cl_{10}$, and the salt of organic acid anion such as $LiCF_3SO_3$, $Li(CF_3SO_2)_2N$ and $Li(C_2F_5SO_2)_2N$ can be used. What can be used as the plasticizer is an organic solvent (plasticizer) such as an aprotic solvent, which is formed of one type or two or more mixed types selected from: a cyclic carbonate group such as propylene carbonate and ethylene carbonate; a linear chain carbonate group such as dimethyl carbonate, ethylmethyl carbonate and diethyl carbonate; an ether group such as tetrahydrofuran, 2-methyltetrahydrofuran, 1,4-dioxane, 1,2-dimethoxyethane and 1,2-dibutoxyethane; a lactone group such as gamma-butyrolactone; a nitrile group such as acetonitrile; an ester group such as methyl propionate; an amide group such as dimethylformamide; methyl acetate, and methyl formate. However, the plasticizer is not limited to these.

As the polymer without the lithium ion conductivity, which is for use in the polymer gel electrolyte, for example, polyvinylidene fluoride (PVDF), polyvinyl chloride (PVC), polyacrylonitrile (PAN), polymethyl methacrylate (PMMA) and the like can be used. However, the polymer is not limited to these. Note that PAN, PMMA and the like slightly have the ion conductivity, and accordingly can also be defined as the above-mentioned polymer with the ion conductivity. However, PAN and PMMA are shown here as examples of the polymer without the lithium ion conductivity.

While the solid polymer electrolyte or the polymer gel electrolyte is the polymer electrolyte constituting the battery, the solid polymer electrolyte or the polymer gel electrolyte can also be contained in the positive electrodes and/or the negative electrodes as described above. Depending on the polymer electrolyte, the positive electrodes, and the negative electrodes, which constitute the battery, different electrolytes may be used, or the same electrolyte may be used. Alternatively, different electrolytes may be used depending on the layers.

The thickness of the electrolytes 14 is not particularly limited. However, in order to obtain a compact bipolar battery, it is preferable to thin the thickness as much as possible within a range where a function as the electrolytes 14 can be ensured. The thickness of layers of the solid polymer electrolyte generally ranges approximately from 10 to 100 µm.

The laminate films 20 are battery casing materials for housing the battery element 10 for the purpose of protection thereof from an external impact and prevention of an environmental deterioration when the battery is used. As the laminate films 20, a battery casing material such as a polymer-metal composite laminate film and an aluminum-laminated film in each of which metal is coated with resin films as insulators can be used. Specifically, each of the laminate films 20 includes a metal layer 21 composed of metal (including an alloy) such as aluminum, stainless steel, nickel and copper, an outside resin layer 22 disposed on the outside surface of the metal layer 21 and composed of resin, and an inside resin layer 23 disposed on the inside surface of the metal layer 21 and composed of resin. It is preferable that the bipolar battery 1 be constituted to be hermetically sealed in a manner that the battery element 10 located at the center is covered on both sides up and down with the laminate films 20 and peripheral portions of the laminate films 20 are partially or entirely joined together by heat sealing. In this case, the tabs 30 are structured to be sandwiched between the portions sealed by heat and to be exposed to the outsides of the laminate films 20.

The tabs 30 function as electrodes of the entire bipolar battery 1. As a material of the tabs, metal such as copper, iron, aluminum and stainless steel, or an alloy containing these, can be used.

Figure 3:
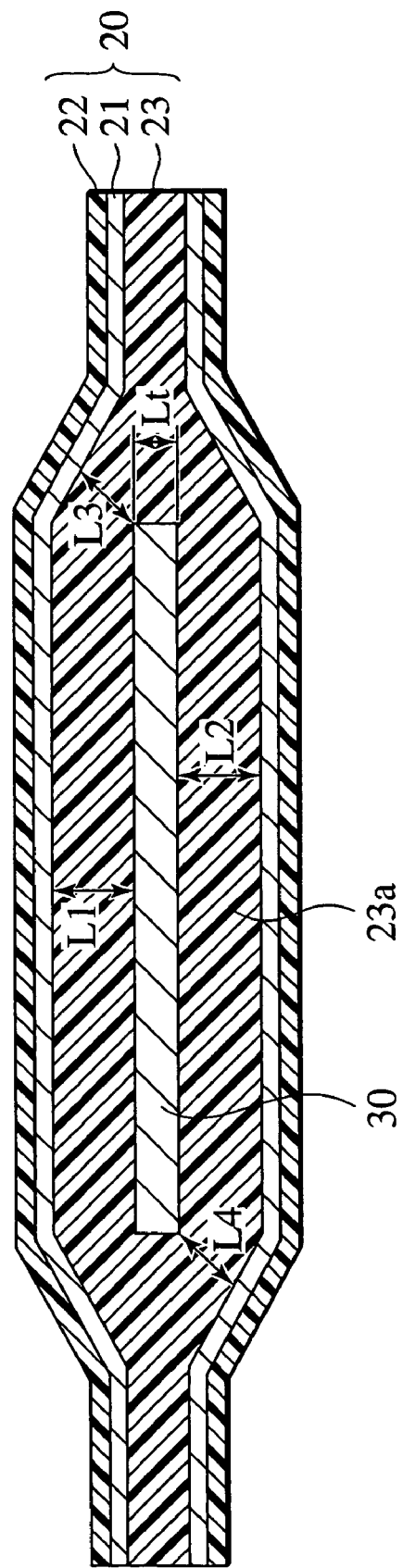
FIG. 3 is an enlarged cross-sectional view along a line III-III of FIG. 2.

In this embodiment, as shown in FIG. 3, thicknesses L1 to L4 of a resin layer 23a (hereinafter, referred to as a "boundary resin layer 23a") interposed between the tabs 30 and the metal layers 21 of the laminate films 20 are set more than thickness $L_t$ of each tab 30. Portions where the tabs 30 and the metal layers 21 come closest to each other are portions of the boundary resin layer 23a, which correspond to sealed portions of the inside resin layers 23 and tabs 30. Hence, it is necessary that the thickness of the boundary resin layer 23a described above be more than the thickness $L_t$ of the tabs 30 in all of the directions around the tabs. The boundary resin layer 23a may be formed only around the tabs 30, or may be formed over all of the peripheral portions of the laminate films 20. Moreover, the entire inside resin layers 23 of the laminate films 20 may be formed in thickness equal to or more than the thickness $L_t$ of each tab.

Such a constitution makes it possible to ensure insulation resistant to high voltage. Specifically, even if the high voltage is applied to the tabs 30 on both ends of the bipolar battery, the insulation is ensured by the boundary resin layer 23a in the vicinities of the tabs. Here, the high voltage refers to the maximum voltage which the tabs can endure.

The present invention is one that has been created based on the following findings: tabs of a battery to which a large current has to be flown are essentially thickened, and accordingly, it is necessary to thicken a boundary resin layer for ensuring insulation in response to an increase of the thickness of the tabs described above; and the insulation is ensured if the thickness of the boundary resin layer is thickened more than the thickness of the tabs.

Moreover, the boundary resin layer in the vicinities of the tabs is thickened, and thus vibrations applied to the tabs, for example, when the battery is mounted on a vehicle are reduced, and in addition, it is made possible to shift a resonance point out of a range of vibrations that can occur on the vehicle. Thus, vibration-proof performance of the bipolar battery is enhanced to a great extent.

It is recommended that the thickness of the boundary resin layer 23a is within a range from 1 to 5 times the thickness of the tabs 30, preferably within a range from 1 to 3 times the same, and more preferably within a range from 1 to 2 times the same. The reason that the lower limit is provided is to avoid an occurrence of dielectric breakdowns in the tabs 30 on both ends of the bipolar battery without fail. Meanwhile, the reason that the upper limit is provided is to avoid a possible occurrence of breakdowns of portions other than the tabs 30 of the bipolar battery due to the vibrations. In this case, the breakdowns are ones that can occur in a manner that the vicinities of the tabs 30 are thickened too much and become lumps, and that a vibration mode of the bipolar battery is changed.

It is recommended that the thickness of the boundary resin layer 23a is within a range from 15 to 1000 µm, preferably within a range from 100 to 500 µm, and more preferably within a range from 100 to 300 µm. The reason that the lower limit is provided is to make it possible to apply the boundary resin layer 23a also to a bipolar battery having tabs with a thickness of approximately 15 µm and specifications of small current and voltage. Meanwhile, the reason that the upper limit is provided is to make it possible to apply the boundary resin layer 23a to a bipolar battery having tabs with a thickness of approximately 200 µm and specifications of large current and voltage for vehicle use.

The inside resin layer 23 including the boundary resin layer 23a of this embodiment is composed of one resin selected from the group consisting of polyethylene series resin, polypropylene series resin and polyamide series resin. This is because these resins can be used as resins having performances such as waterproof performance, moistureproof performance, thermal-cycle resistance, thermal stability, insulating performance and flame resistance. However, a material for use in the boundary resin layer 23a of the present invention is not limited to the above-described resins, and for example, the material may be other resins such as silicon rubber or olefin series elastomer.

Figure 4:
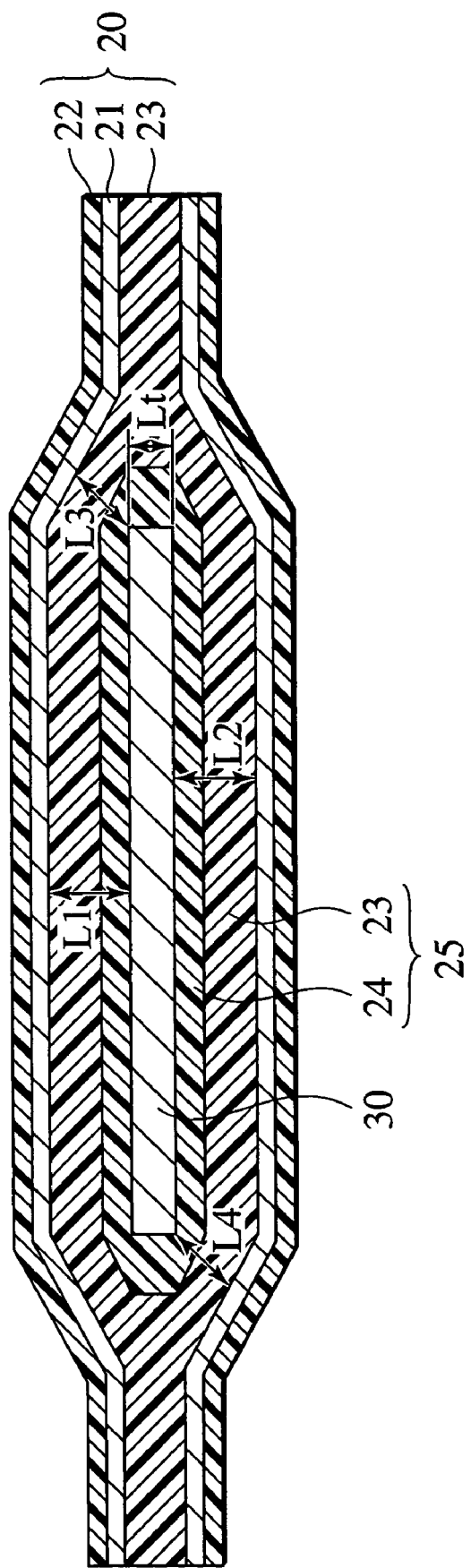
FIG. 4 is an enlarged cross-sectional view showing a modification example of a resin layer in a boundary portion.

FIG. 4 shows a modification example of the boundary resin layer. A boundary resin layer 25 shown in FIG. 4 is composed of one in which two resins selected from the group of the above-described resins for use in the boundary resin layer 23a are stacked. Specifically, the boundary resin layer 25 is composed of the inside resin layer 23 and a covering resin layer 24 surrounding each tab 30. The boundary resin layer 25 is composed of two or more types of the resins as described above, thus making it possible to certainly enhance adhesiveness of the tabs and resins and to certainly prevent water from entering the inside of the battery. Note that the boundary resin layer 25 may be composed of three or more stacked resins selected from the above-described group. Alternatively, the boundary resin layer 25 may be composed of one formed by mixing two or more resins selected from the above-described group.

In a manufacturing method of the boundary resin layer 25, first, the covering resin layer 24 is provided around the tab 30, and thereafter, the laminate films 20 are coated on the covering resin layer 24 from both sides thereof in the vertical direction, and the peripheral portions of the laminate films are sealed by heat while sandwiching the covering resin layer therebetween. Thus, the boundary resin layer 25 can be manufactured. As described above, the boundary resin layer 25 is composed of two or more resins, and thus it becomes unnecessary to thicken only a portion of the inside resin layer 23 of the laminate films 20, the portion being around each tab 30. Moreover, the covering resin layer 24 is provided, and accordingly, a laminate film in which layer thickness of the inside resin layer 23 is thin can also be used.

It is recommended that Young's modulus of the resins constituting the boundary resin layer is within a range from $0.01 \times 10^{10}$ to $0.30 \times 10^{10}$ $N/m^2$, preferably within a range from $0.05 \times 10^{10}$ to $0.30 \times 10^{10}$ $N/m^2$, and more preferably within a range from $0.10 \times 10^{10}$ to $0.30 \times 10^{10}$ $N/m^2$. The reason that the lower limit is provided is to avoid reducing a vibration-proof effect because the layer becomes softened too much. Meanwhile, the reason that the upper limit is provided is to avoid reducing the vibration-proof effect because the layer becomes hardened too much. Moreover, the Young's modulus of the resins constituting the boundary resin layer is set within the above-described range, and thus a resonance frequency of the bipolar battery 1 can be moved to a high-frequency side. Thus, it is made possible to shift the resonance frequency out of a range of vibrations (within 100 Hz) usually occurring on the vehicle. As a result of this, the bipolar battery 1 of the present invention comes not to resonate on the vehicle, and can exert excellent vibration-proof performance. Note that, when the boundary resin layer is composed of the one formed by stacking two or more resins, an average value of Young's moduli of the stacked resins is used as the entire Young's modulus. Moreover, when the boundary resin layer is composed of the one formed by mixing two or more resins, Young's modulus of the resin formed by the mixture is used as the entire Young's modulus.

Preferably, the boundary resin layer 25 is composed of one resin selected, among the above-described group of resins, from the group consisting of low-density polyethylene, non-modified polypropylene, nylon 6,6 (poly(hexamethylene adipamide)) and nylon 6,10 (poly(hexamethylene sebacamide)), or composed of one formed by stacking two or more resins selected from the group concerned. If the resins described above are used as the resins constituting the boundary resin layer, a higher vibration-proof effect can be obtained. Specifically, these resins have a large elongation as a mechanical property and exert a function to easily deform reversibly for the vibrations applied thereto, and accordingly, have the higher vibration-proof effect.

As described above, according to the bipolar battery of this first embodiment to which the present invention is applied, the thickness of the resin layer interposed between the tabs composed by being extracted from the battery element to the outsides of the laminate films and the metal layers of the laminate films is set more than the thickness of the tabs. Accordingly, it is possible to ensure the insulation resistant to the high voltage, and sufficient insulating performance can be obtained, for example, even for use in the vehicle. In addition, while the above-described resin layer can reduce the vibrations applied to the bipolar battery, it is possible to move the resonance frequency of the bipolar battery to the high-frequency side and to shift the resonance frequency out of the range of the vibrations usually occurring on the vehicle. In such a way, the bipolar battery can exert the excellent vibration-proof performance.

Second Embodiment

A second embodiment of the present invention is an assembled battery in which a plurality of the bipolar batteries of the above-described first embodiment are connected to one another.

Figure 5A:
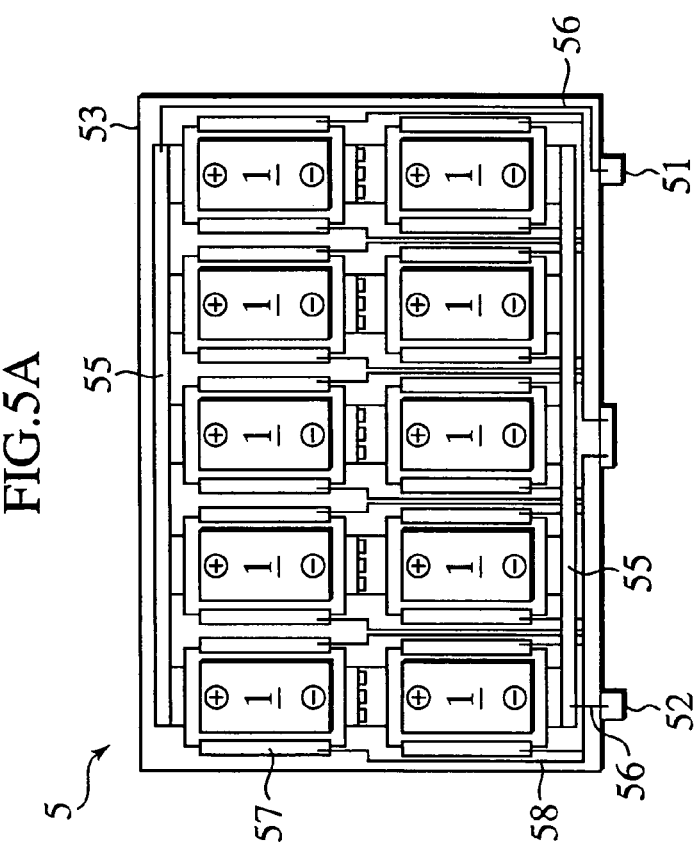
FIG. 5A is a plan view of an assembled battery according to a second embodiment of the present invention.
Figure 5C:
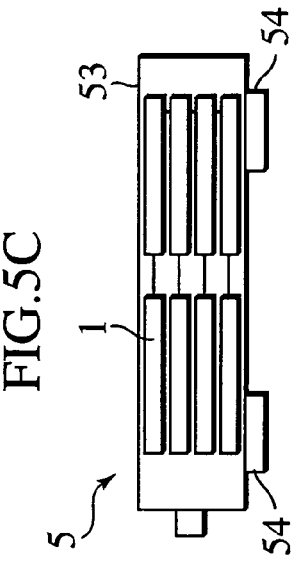
FIG. 5C is a side view of the assembled battery according to the second embodiment of the present invention.
Figure 5B:
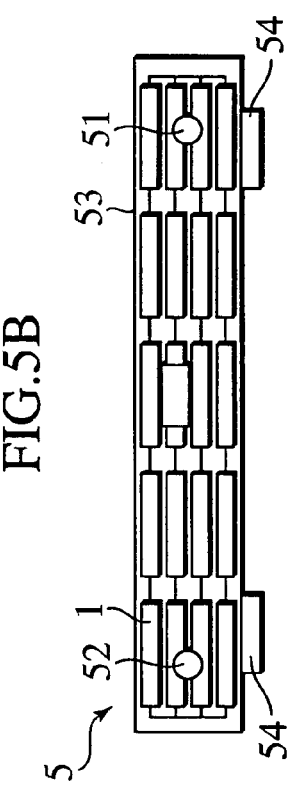
FIG. 5B is a front view of the assembled battery according to the second embodiment of the present invention.

As shown in FIGS. 5A to 5C, an assembled battery 5 includes an outer case 53 supported by outer elastic members 54. In the outer case 53 of this assembled battery 5, one composed by connecting groups in parallel is housed, the groups being composed by connecting in series the plurality of bipolar batteries 1 according to the above-described first embodiment. Note that it is possible to arbitrarily set the numbers of bipolar batteries 1 connected in series and in parallel in the assembled battery 5.

For example, the assembled battery shown in FIGS. 5A to 5C is an assembled battery with a voltage of 42 V and a capacity of 1 Ah, which is composed by connecting 20 units in parallel, each of the units being composed by connecting in series two bipolar batteries 1, each of which has a voltage of 21 V and a capacity of 50 mAh. Note that reference symbols "+" and "−" in FIGS. 5A to 6C denote polarities of the bipolar batteries.

In portions where the bipolar batteries 1 are connected in parallel, for example, tabs of the respective batteries are connected though conductive bars 55 made of copper. Moreover, in portions where the bipolar batteries 1 are connected in series, the tabs of the respective batteries are interconnected by, for example, vibration welding. Note that, for the portions where the bipolar batteries 1 are interconnected in series and in parallel in the assembled battery 5, a variety of connecting methods such as ultrasonic welding, thermal welding, laser welding, riveting, caulking and electronic beaming can be used. By employing the connecting methods as described above, an assembled battery reliable for a long period of time can be manufactured.

Moreover, as electrodes of the assembled battery 5, electrode terminals 51 and 52 are provided on a front surface of the assembled battery 5. To the electrode terminals 51 and 52, end portions of the portions where the bipolar batteries 1 are connected in series are connected through electrode leads 56. Furthermore, to both side portions of the bipolar batteries 1, sensing tabs 57 for detecting the voltages of the bipolar batteries 1 are extracted, and detecting leads 58 connected to these sensing tabs 57 are extracted to the front surface of the assembled battery 5.

According to the assembled battery of the second embodiment, the bipolar batteries 1 of the above-mentioned first embodiment are formed into the assembled battery, thus making it possible to obtain a higher-energy and higher-power assembled battery than a conventional assembled battery of the same size.

Third Embodiment

A third embodiment of the present invention is an assembled battery in which the bipolar battery of the above-mentioned first embodiment and a group composed by connecting a plurality of normal batteries in series are combined. Note that description will be omitted for portions similar to those of the assembled battery of the second embodiment.

As shown in FIGS. 6A to 6C, what is housed in an outer case 53 of an assembled battery 5a is one in which the bipolar battery 1 according to the above-mentioned first embodiment and a battery group composed by connecting in series a plurality of normal batteries 4 that are not the bipolar batteries are connected in parallel.

Figure 7A:
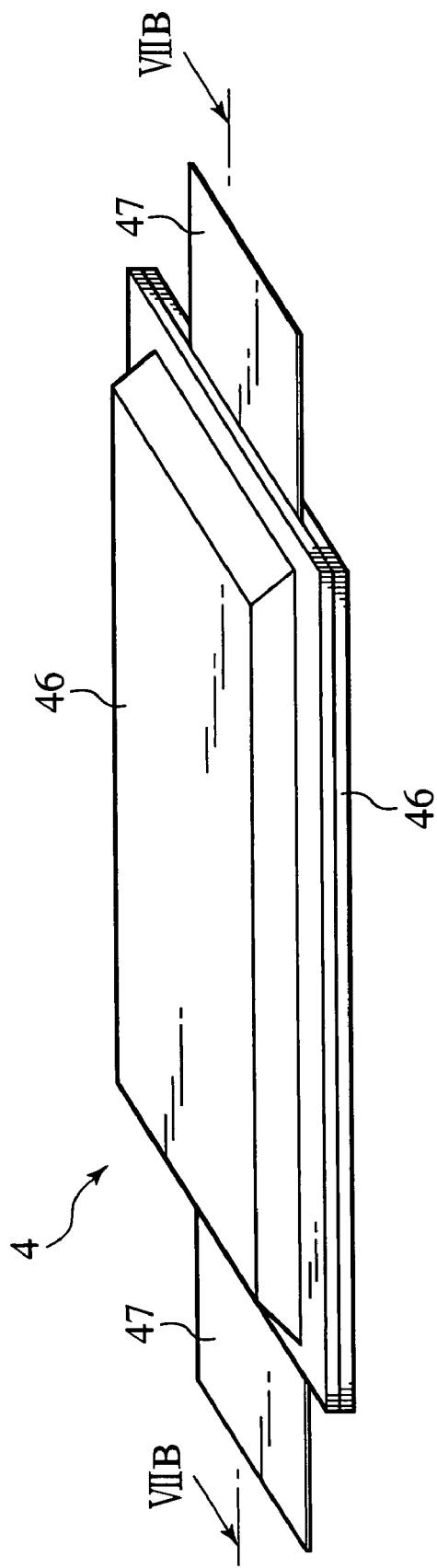
FIG. 7A is a perspective view of a normal battery according to the third embodiment of the present invention.
Figure 7B:
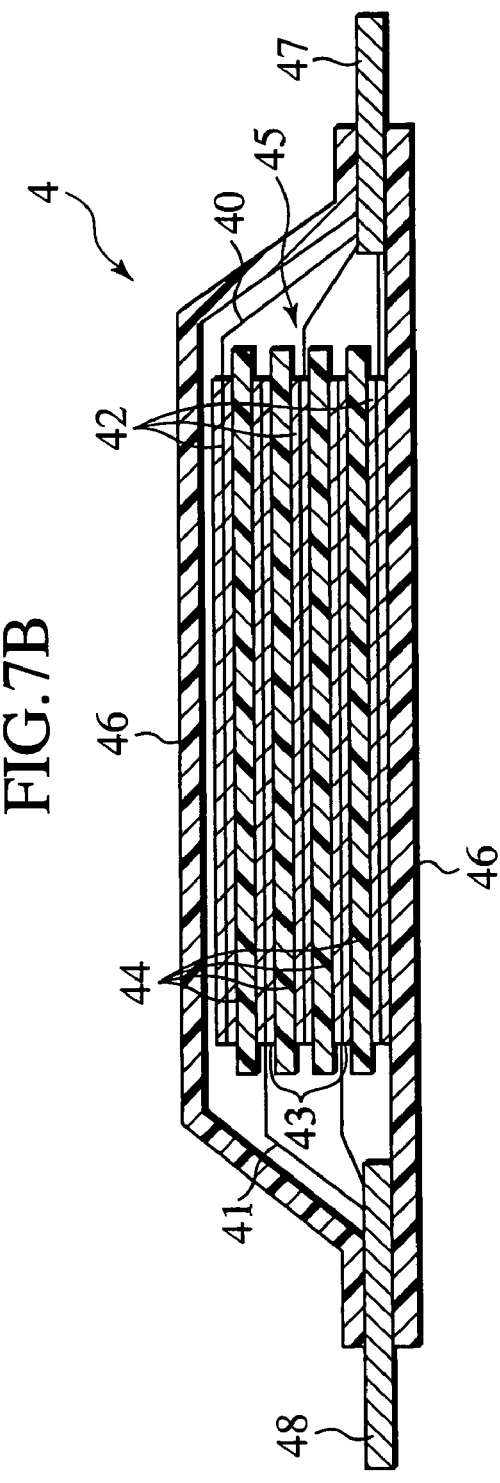
FIG. 7B is a cross-sectional view along a line VIIB-VIIB of FIG. 7A.

As shown in FIGS. 7A and 7B, each of the normal batteries 4 is configured in such a manner that a power generating element 45 is hermetically sealed by thermally welding laminate films 46. The power generating element 45 is formed by stacking positive electrode plates 42 in each of which positive electrode layers composed of the same materials of the positive electrode of the bipolar battery 1 are formed on both surfaces of a positive electrode collector 40, negative electrode plates 43 in each of which negative electrode layers composed of the same materials of the negative electrode of the bipolar battery 1 are formed on both surfaces of a negative electrode collector 41, and separators 44 interposed therebetween. The laminate films 46 are formed by combining polymer and metal with each other in a vertical direction. The positive electrode tab 47 and the negative electrode tab 48 are extracted from the power generating element 45 to outsides of the laminate films 46. Further, the separator 44 has a function as an electrolyte.

In the battery group, a certain number of normal batteries 4, which is equal to the number of constituent units of the battery element 10 in the bipolar battery 1, are connected in series, and thus the battery group has the same voltage as that of the bipolar battery 1. Here, the constituent units of the battery element 10 refer to the minimum units, each having a function to generate an electromotive force. Each constituent unit corresponds to a single cell composed by sandwiching an electrolyte between a positive electrode and a negative electrode.

Note that a group composed by connecting a plurality of the bipolar batteries 1 may be used in the assembled battery 5a. However, it should be noted that a total voltage of the portion composed of the bipolar batteries 1 and a total voltage of the portion composed of the normal batteries 4 must be set equal to each other.

For example, the assembled battery shown in FIGS. 6A to 6C is an assembled battery composed by connecting in parallel the bipolar battery 1 with a voltage of 42 V and a capacity of 50 mAh and a battery group composed by connecting in series 10 pieces of normal batteries 4 (for example, normal lithium ion batteries), each having a voltage of 4.2 V and a capacity of 1 Ah.

According to the assembled battery of the third embodiment, the bipolar battery 1 can play a main role for high-power characteristics, and the battery group in which the normal batteries 4 are connected in series can play a main role for high-energy characteristics. Hence, this assembled battery can be extremely effective means for making the high energy and the high power compatible with each other in good balance. In addition, it is made possible to reduce the weight and size of the assembled battery.

Fourth Embodiment

A fourth embodiment is a combination assembled battery in which a plurality of the assembled batteries according to the above-mentioned second or third embodiment are connected to one another.

A combination assembled battery 6 shown in FIGS. 8A to 8C is a battery formed into a module in a manner that a plurality of the assembled batteries 5 according to the second embodiment are stacked and coupled by means of plates 63 and screws 64 and that the electrode terminals 51 and 52 of the respective assembled batteries 5 are connected to one another by means of conductive bars 61 and 62. In FIGS. 8A to 8C, for example, 6 pieces of the assembled batteries 5, each having a voltage of 42 V and a capacity of 1 Ah, are connected in parallel, and thus the combination assembled battery 6 with a voltage of 42 V and a capacity of 6 Ah is constituted. Note that a combination assembled battery can be constituted by use of the assembled batteries 5a according to the third embodiment in a similar way. Moreover, the assembled batteries can be interconnected in series and/or in parallel.

As described above, the assembled batteries are formed into the module, thus facilitating battery control, and for example, making it possible to constitute the optimum combination assembled battery as a battery to be mounted on a vehicle such as an electric vehicle and a hybrid vehicle. Moreover, this combination assembled battery 6 is one using the above-mentioned assembled batteries, and accordingly, becoming reliable for a long period of time.

Fifth Embodiment

A fifth embodiment is a vehicle composed by having the assembled battery or the combination assembled battery according to the above-mentioned second, third or fourth embodiment mounted thereon and using the assembled battery or the combination assembled battery as a power source of a motor. As the vehicle using the assembled battery or the combination assembled battery as the power source for the motor, for example, a vehicle in which wheels are driven by a motor, such as the electric vehicle and the hybrid vehicle, are given.

Figure 9:
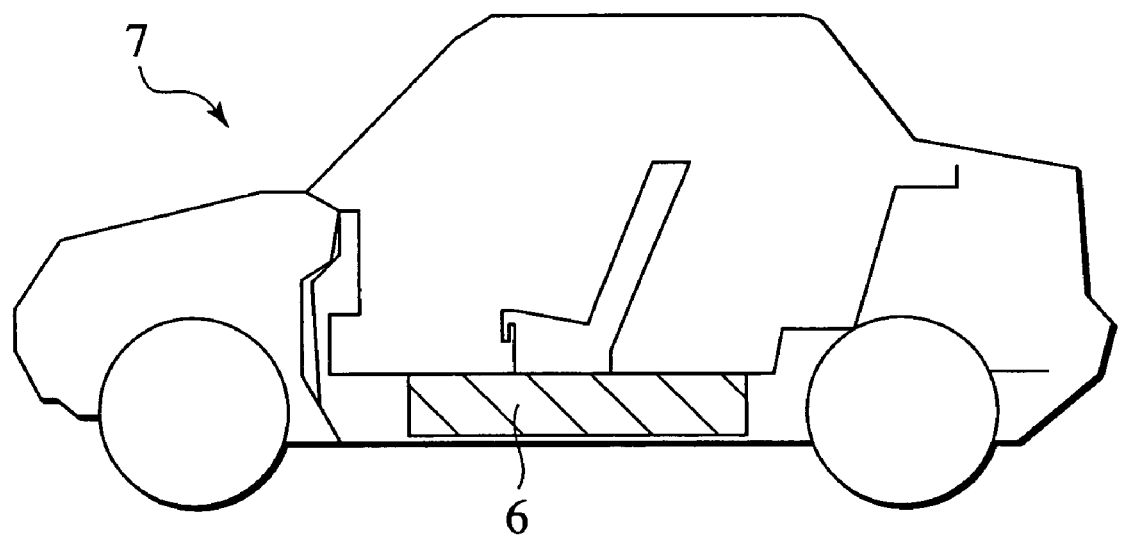
FIG. 9 is a schematic view of a vehicle having the assembled battery or the combination assembled battery mounted thereon.

FIG. 9 shows a vehicle having the combination assembled battery mounted thereon. A combination assembled battery 6 can be disposed under a floor of a vehicle 7, behind a seatback, or under a seat. Note that the assembled batteries 5 and 5a can also be mounted on the vehicle 7 in a similar way.

The assembled batteries 5 and 5a and the combination assembled battery 6, which are mounted on the vehicle, have the characteristics mentioned above. Therefore, the vehicle composed by having the assembled battery 5 or 5a or the combination assembled battery 6 mounted thereon has high reliability, and the assembled battery 5 or 5a or the combination assembled battery 6 can provide sufficient power even after being used for a long period of time. Moreover, the use of the assembled battery 5 or 5a or the combination assembled battery 6 can reduce a space in which the battery is to be disposed, leading also to achievement of weight reduction of the vehicle.

Effects of the present invention will be described by use of the following examples and comparative examples. However, the technical scope of the present invention is not limited to the following examples. Note that FIG. 10 shows constitutions of bipolar batteries of the examples and comparative examples, and evaluation results thereof. FIG. 11 shows names and characteristics of resins shown in FIG. 10.

Constitutions of Examples and Comparative Examples

In Example 1, a bipolar battery was used, in which the number of constituent units was 10, the boundary resin layer in the vicinities of the tabs was structured as shown in FIG. 3, the resin constituting the boundary resin layer was polyethylene (PE), the thickness of the tabs was 150 μm, the ratio ($L/L_t$) of the thickness (L) of the boundary resin layer to the thickness ($L_t$) of the tabs was 1, the positive electrode active material was Li—Mn-based composite oxide, and the negative electrode active material was a non-crystalline carbon material.

In Example 2, a bipolar battery was used, which was constituted similarly to that of Example 1 except that the resin constituting the boundary resin layer was low-density PE.

In Example 3, a bipolar battery was used, which was constituted similarly to that of Example 1 except that the resin constituting the boundary resin layer was polypropylene (PP).

In Example 4, a bipolar battery was used, which was constituted similarly to that of Example 1 except that the resin constituting the boundary resin layer was non-modified PP.

In Example 5, a bipolar battery was used, which was constituted similarly to that of Example 1 except that the resin constituting the boundary resin layer was nylon (polyamide (PA)).

In Example 6, a bipolar battery was used, which was constituted similarly to that of Example 1 except that the resin constituting the boundary resin layer was nylon 6,10.

In Example 7, a bipolar battery was used, in which the number of constituent units was 10, the boundary resin layer in the vicinities of the tabs was structured as shown in FIG. 3, the resin constituting the boundary resin layer was non-modified PP, the thickness of the tabs was 100 µm, the ratio ($L/L_t$) of the thickness (L) of the boundary resin layer to the thickness ($L_t$) of the tabs was 2, the positive electrode active material was Li—Mn-based composite oxide, and the negative electrode active material was a crystalline carbon material.

In Example 8, a bipolar battery was used, which was constituted similarly to that of Example 7 except that the thickness of the tabs was 50 µm, the ratio ($L/L_t$) was 5, and the negative electrode active material was a non-crystalline carbon material.

In Example 9, a bipolar battery was used, in which the number of constituent units was 10, the boundary resin layer in the vicinities of the tabs was structured as shown in FIG. 4, the inside resin of the boundary resin layer, which contacted the tabs, was low-density PE, and the outside resin thereof was PE, the thickness of the tabs was 250 µm, the ratio ($L/L_t$) was 2, the positive electrode active material was Li—Mn-based composite oxide, and the negative electrode active material was a non-crystalline carbon material. Note that a ratio of the thickness of the low-density PE layer to the thickness of the tabs and a ratio of the thickness of the PE layer to the thickness of the tabs were both set at 1.

In Example 10, a bipolar battery was used, which was constituted similarly to that of Example 9 except that the inside resin of the boundary resin layer, which contacted the tabs, was non-modified PP, and the outside resin thereof was PP, and the ratio ($L/L_t$) was 3. Note that a ratio of the thickness of the non-modified PP layer to the thickness of the tabs was set at 2 and a ratio of the thickness of the PP layer to the thickness of the tabs was set at 1.

In Example 11, a bipolar battery was used, which was constituted similarly to that of Example 4 except that the number of constituent units was 100 and the thickness of the tabs was 300 µm.

In Comparative Example 1, a bipolar battery was used, which was constituted similarly to that of Example 4 except that the ratio ($L/L_t$) was 0.1. This value of $L/L_t$ in this Comparative Example 1 is one conventionally known in public.

In Comparative Example 2, a bipolar battery was used, which was constituted similarly to that of Example 4 except that the thickness of the tabs was 50 µm and the ratio ($L/L_t$) was 0.9.

Moreover, in the above-described Examples and Comparative Examples, stainless steel was used as the material of the tabs, and aluminum was used as the material of the metal layer of the laminate film.

(Testing Methods)

1. Measurement of Average Attenuation

An acceleration pickup was set on an approximately center portion (approximately center portion in the plan view of FIG. 1) of the bipolar battery. Then, a vibrational spectrum of the acceleration pickup when the center portion was hammered by an impulse hammer was measured. A setting method of the acceleration pickup was made to conform to JIS B 0908 (ISO 5347). The measured vibrational spectrum was analyzed by an FET analyzer and converted into dimensions of frequency (Hz) and acceleration (dB). Averaging (of N equal to 50) and smoothing were performed for the obtained frequencies, and a graph of spectrum of vibration transmissibilities was obtained. A reduction rate (%) of a peak value (dB) expressing the largest vibration transmissibility in the graph of the spectrum of the vibration transmissibilities with respect to a reference value (dB) was defined as an average attenuation. A larger value of the average attenuation represents a greater reduction of the vibrations. Here, the reference value was set at a peak value in a graph of spectrum of vibration transmissibilities of the above-described Comparative Example 1.

2. Measurement of Shift Amount of Resonance Point

A primary resonance frequency in the graph of the spectrum of the vibration transmissibilities, which was obtained in the above-described evaluation, was compared with a primary resonance frequency of the graph of the spectrum of the vibration transmissibilities in Comparative Example 1. Then, a difference (Hz) from the primary resonance frequency of Comparative Example 1 was defined as a shift amount of a resonance point.

3. Inspection of Insulating Property

A resistance value between the tab and the metal layer of the laminate film was measured by use of an insulation resistance meter. A bipolar battery which exhibited an insulation resistance of 100 MΩ or more when a voltage of 500 V was applied between the tab and the metal layer was determined to be acceptable (Y), and a bipolar battery which exhibited only an insulation resistance less than 100 MΩ in the same case as above was determined to be un-acceptable (Evaluation Results)

Evaluation Results Shown in FIG. 10 were Obtained.

With regard to the bipolar batteries of Examples 1 to 11 in each of which the thickness of the resin layer interposed between the tabs and the metal layers of the laminate films was set equal to or more than the thickness of the tabs, the insulating properties thereof passed the evaluation. On the other hand, with regard to the bipolar batteries of Comparative Examples 1 and 2 in each of which the thickness of the boundary resin layer was smaller than the thickness of the tabs, the insulating properties thereof failed in the evaluation.

Moreover, in the case of Examples 1 to 11, the average attenuations ranging from 10 to 60% were obtained, and the vibrations of the bipolar batteries could be reduced more than those of the conventional batteries. In addition, in the case of Examples 1 to 11, the shift amounts of the resonance points, which ranged from 85 to 170 Hz, were obtained. Thus, the resonance frequency of each bipolar battery could be moved to the high-frequency side, thus making it possible to shift the resonance frequency out of the range of the vibrations usually occurring on the vehicle.

Figure 12:
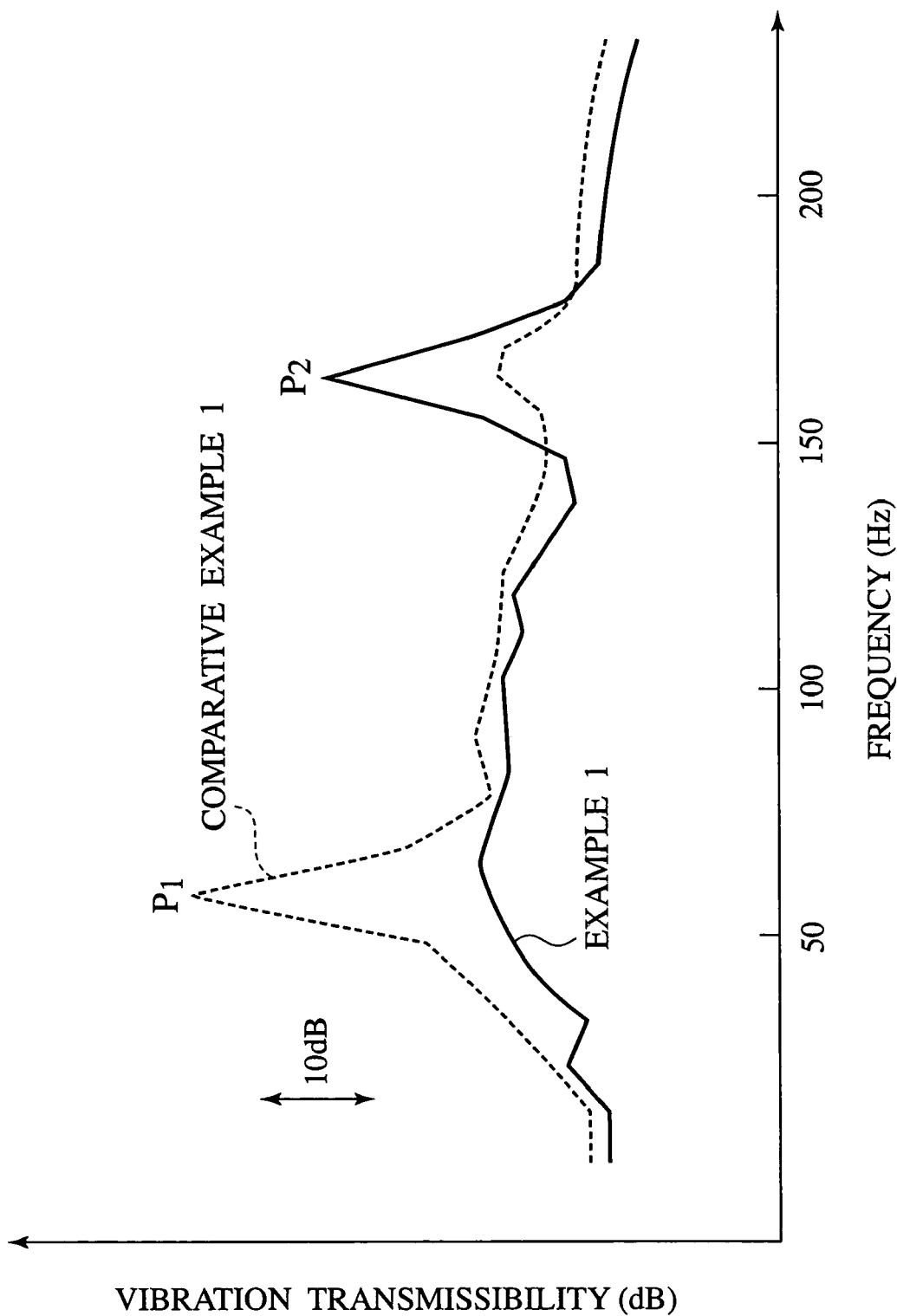
FIG. 12 is an example of a graph of spectra of vibration transmissibilities for explaining a reduction of vibrations and a movement of a resonance point regarding the bipolar battery.

FIG. 12 is an example of the graph of the spectra of the vibration transmissibilities, showing the reduction of the vibrations and the movement of the resonance point in the bipolar battery. FIG. 12 shows the spectra of the vibration transmissibilities of the above-described Example 1 and Comparative Example 1. As shown in FIG. 12, it is understood that a value of peak $P_2$ of Example 1 was reduced by 22% from a value of peak $P_1$ of Comparative Example 1 and that the primary resonance frequency that was 60 Hz at the peak $P_1$ was moved to 170 Hz at the peak $P_2$.

The entire content of a Japanese Patent Application No. P2003-290977 with a filing date of Aug. 8, 2003 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A bipolar battery, comprising:
a battery element composed by stacking in series a plurality of bipolar electrodes, in each of which a positive electrode is formed on one surface of a collector and a negative electrode is formed on the other surface, with electrolytes interposed therebetween;
laminate films covering the battery element, each of the laminate films containing a metal layer, the battery element being hermetically sealed in a space formed by the laminate films; and
tabs being electrically connected to the battery element and being drawn from inside of the space to outside of the laminate films so that a part of each tab is exposed to the outside of the laminate films,
wherein, in peripheral portions of the laminate films, which are sealed, a resin layer covers around each tab, and thickness of the resin layer interposed between each tab and the metal layer is within a range of 1 to 5 times thickness of each tab in all directions around the tabs.

2. A bipolar battery according to claim 1,
wherein the thickness of each tab is within a range from 50 μm to 300 μm, and the thickness of the resin layer interposed between each tab and the metal layer is within a range from 150 μm to 600 μm.

3. A bipolar battery according to claim 1,
wherein the resin layer is composed of any of one resin selected from the group consisting of polyethylene series resin, polypropylene series resin, polyamide series resin and one composed by stacking two or more resins selected from the group.

4. A bipolar battery according to claim 3,
wherein the resin layer is composed of any of one resin selected from the group consisting of low-density polyethylene, non-modified polypropylene, nylon 6,6, nylon 6,10, and one composed by stacking two or more resins selected from the group.

5. A bipolar battery according to claim 1,
wherein Young's modulus of resin constituting the resin layer is within a range from $0.01 \times 10^{10}$ to $0.30 \times 10^{10}$ $N/m^2$.

6. A bipolar battery according to claim 1,
wherein the positive electrode contains Li—Mn based composite oxide.

7. A bipolar battery according to claim 1,
wherein the negative electrode contains any one of a crystalline carbon material and a non-crystalline carbon material.

8. An assembled battery comprising:
a plurality of bipolar batteries, each of the bipolar batteries being a battery according to claim 1, wherein a plurality of bipolar batteries are connected in parallel and/or in series.

9. An assembled battery, comprising:
a bipolar battery according to claim 1; and
a battery group composed by connecting in series a number of batteries, the battery including a power generating element which is formed by stacking positive electrode plates in each of which positive electrode layers composed of the same materials of the positive electrode of the bipolar battery are formed on both surfaces of a positive electrode collector, negative electrode plates in each of which negative electrode layers composed of the same materials of the negative electrode of the bipolar battery are formed on both surfaces of a negative electrode collector, and separators interposed therebetween,
wherein the bipolar battery and the battery group are connected in parallel.

10. A combination assembled battery, comprising:
a plurality of assembled batteries, each of the assembled batteries being a battery according to claim 8,
wherein a plurality of the assembled batteries are connected to one another.

11. A vehicle comprising:
an assembled battery according to claim 8.

12. A bipolar battery according to claim 1,
wherein Young's modulus of resin constituting the resin layer is within a range from $0.01 \times 10^{10}$ $N/m^2$ to $0.06 \times 10^{10}$ $N/m^2$.

13. A bipolar battery according to claim 1,
wherein the thickness of the resin layer is within a range from 2 to 5 times thickness of each tab, and Young's modulus of resin constituting the resin layer is within a range from $0.01 \times 10^{10}$ $N/m^2$ to $0.06 \times 10^{10}$ $N/m^2$.

14. A bipolar battery according to claim 1,
wherein the resin layer is directly sandwiched between each tab and the metal layer, and the resin layer is a single layer.

* * * * *